United States Patent
Mizuno et al.

(10) Patent No.: US 6,446,609 B2
(45) Date of Patent: Sep. 10, 2002

(54) METHOD AND APPARATUS FOR CONTROLLING ENGINE FUEL INJECTION

(75) Inventors: Hiroyuki Mizuno, Toyota; Zenichiro Mashiki, Nisshin, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/842,191

(22) Filed: Apr. 26, 2001

Related U.S. Application Data (63) Continuation of application No. PCT/JP99/05445, filed on Oct. 4, 1999.

(30) Foreign Application Priority Data

Oct. 27, 1998 (JP) ............................................ 10-305499

(51) Int. Cl.[7] .............................................. F02D 41/04
(52) U.S. Cl. .................. 123/479; 123/295; 123/198 D; 123/198 DB
(58) Field of Search ...................... 123/198 D, 198 DB, 123/295, 397, 398, 457, 479, 481, 480, 491, 359, 357

(56) References Cited

U.S. PATENT DOCUMENTS

| | | | |
|---|---|---|---|
| 5,241,933 A | * | 9/1993 | Morikawa ............... 123/198 D |
| 5,893,352 A | | 4/1999 | Fujiwara ..................... 123/479 |
| 6,032,639 A | * | 3/2000 | Goto et al. .................. 123/295 |
| 6,138,638 A | * | 10/2000 | Morikawa ................... 123/295 |
| 6,238,108 B1 | * | 9/2001 | Matsufuji et al. ........... 123/690 |

FOREIGN PATENT DOCUMENTS

| | | | |
|---|---|---|---|
| JP | 09-032617 | 2/1997 | |
| JP | 10-068352 | 3/1998 | |
| JP | 10-077892 | 3/1998 | |
| JP | 10-176587 | 6/1998 | |
| JP | 11-002145 | 1/1999 | |
| JP | 145517 | * 5/2000 | ........... F02D/41/04 |
| JP | 274322 | * 10/2000 | ........... F02D/41/04 |

* cited by examiner

Primary Examiner—Tony M. Argenbright
Assistant Examiner—Hai H. Huynh
(74) Attorney, Agent, or Firm—Pillsbury Winthrop LLP

(57) ABSTRACT

An engine has an improved fuel injection control apparatus the pressure boosting and method that prevents misfire and prevents unburned fuel from entering the exhaust system. The fuel injection system has two pumps, a primary pump and a booster pump. When an abnormality occurs in the booster pump, it is stopped, and fuel injection is performed by the primary pump. When the booster pump is stopped, a fuel injection valve or an air intake device is regulated such that the air/fuel mixture formed in the combustion chambers will not misfire, and unburned fuel will not remain and enter the exhaust system.

20 Claims, 7 Drawing Sheets

METHOD AND APPARATUS FOR CONTROLLING ENGINE FUEL INJECTION

RELATED APPLICATIONS

This application is based on and claims priority from Japanese Patent Application No. 10-305499 filed Oct. 27, 1998 and is a continuation of International Application No. PCT/JP 99/05445, filed Oct. 4, 1999, the contents of both being incorporated hereinto by reference.

BACKGROUND OF THE INVENTION

The present invention relates to a control device and control method for an engine having fuel injection valves for directly injecting fuel into combustion chambers.

Recently, vehicular engines of a type that switch the combustion mode in accordance with the running state of the engine have been proposed and put into practical use to improve fuel efficiency and to provide sufficient engine power at the same time. Such engines have fuel injection valves for directly injecting fuel into combustion chambers. In a high engine speed and high load state where high power is required, fuel is combusted while it is evenly mixed with air so that sufficient engine power is provided. Such combustion is called homogeneous charge combustion. To perform homogeneous charge combustion, fuel is injected into a combustion chamber during the suction stroke of the engine. The injected fuel is evenly mixed with air in the combustion chamber and the homogeneous mixture of air land fuel is ignited by an ignition plug.

In a low engine speed and low load state where high power is not required, stratified charge combustion is executed to improve fuel efficiency. In stratified charge combustion, the fuel concentration around the ignition plug is increased to improve ignitability and combustion is carried out while the average air-fuel ratio of the mixture in the combustion chamber is set greater than the stoichiometric air-fuel ratio. To perform stratified charge combustion, fuel is injected into the combustion chamber during the compression stroke. The injected fuel strikes a dent that is provided in the top of the piston and is gathered around the ignition plug. The mixture of the gathered fuel and the air in the combustion chamber is ignited by the ignition plug.

As the combustion mode is switched between homogeneous charge combustion and stratified charge combustion in accordance with the running state of the engine in the manner described above, the fuel efficiency can be improved and sufficient engine power is acquired.

Because such an engine directly injects fuel into combustion chambers, which are under high pressure, it is necessary to set the pressure of fuel to be supplied to the fuel injection valve relatively high. For example, Japanese Unexamined Patent Publication No. 10-176587 discloses an apparatus that supplies fuel under high pressure to fuel injection valves. In this apparatus, a high booster pump pressurizes fuel that has been fed out from a fuel tank by a low booster pump. The pressurized fuel is supplied to the fuel injection valves. Accordingly, the fuel injection valves can directly inject fuel into combustion chambers under high pressure.

When an abnormality occurs in a high-pressure fuel feeding system that includes a high booster pump and a control unit for the pump, the above-described apparatus stops driving the high booster pump and the fuel injection valves inject fuel based on the pressure of the fuel that is delivered from the low booster pump. However, the pressure of the fuel that is fed from the low booster pump is lower than the pressure of the fuel that is pumped from the high booster pump. To acquire the desired amount of fuel injection, therefore, it is necessary to increase the fuel injection time according to the lower fuel pressure.

However, there is a limit to the period during which fuel can be injected in the combustion chambers (injectable period). As the fuel injection time increases, therefore, it becomes difficult to complete the fuel injection within the limited injectable period. When the engine is in a high speed and high load state, particularly, the injectable period is shorter as the engine speed increases, and it is necessary to increase the fuel injection time as the engine load increases. This makes it more difficult to finish fuel injection within the injectable period.

If fuel injection cannot be completed within the injectable period, the amount of fuel in a combustion chamber does not reach the desired value, so that the air-fuel ratio of the mixture gets larger than the adequate value. In this case, the mixture in the combustion chamber is not surely ignited, which may cause misfire. When misfire occurs, unburned mixture enters the exhaust passage of the engine from the combustion chamber. If the unburned mixture is combusted by the heat of the exhaust passage, an exhaust emission purifying catalyst provided in the exhaust passage may be overheated and damaged.

SUMMARY OF THE INVENTION

The present invention has been achieved in view of the above-described circumstances and the object of the present invention is to provide a device and method for engine control which can prevent the occurrence of misfire when an abnormality occurs in a fuel supply device.

To achieve the object, the present invention provides a control device for an engine. The engine produces power by burning a mixture of air and fuel in a combustion chamber. The control device includes a fuel injection valve for directly injecting fuel into the combustion chamber and a fuel supply device for supplying fuel to the fuel injection valve. The fuel supply device includes a primary feeding unit and a secondary feeding unit. The secondary feeding unit further pressurizes fuel fed from the primary feeding unit under a predetermined pressure and supplies that fuel to the fuel injection valve. Control means controls the fuel supply device. When an abnormality occurs in the secondary feeding unit, the control means stops driving the secondary feeding unit such that the fuel injection valve performs fuel injection with fuel pressurized by the primary feeding unit. When the secondary feeding unit is stopped, restriction means restricts driving of the fuel injection valve or the amount of air to be drawn into the combustion chamber such that only a mixture that does not cause misfire is formed in the combustion chamber.

The present invention also provides a control method for an engine for acquiring power by burning a mixture of air and fuel in a combustion chamber. The control method includes supplying fuel to a fuel injection valve from a fuel supply device. The fuel supply device includes a primary feeding unit and a secondary feeding unit. The secondary feeding unit further pressurizes fuel fed from the primary feeding unit under a predetermined pressure and supplies that fuel to the fuel injection valve. The control method further includes directly injecting the pressurized fuel into the combustion chamber from the fuel injection valve; stopping the secondary feeding unit such that the fuel injection valve performs fuel injection at the pressure of the fuel fed from the primary feeding unit, when an abnormality occurs in the secondary feeding unit; and forming only a mixture that does not cause misfire in the combustion chamber, when the secondary feeding unit is stopped.

When driving of the secondary feeding unit is stopped, only a mixture that does not cause misfire is formed in the combustion chamber, and a mixture that causes misfire is not formed in the combustion chamber. Therefore, the mixture in the combustion chamber is reliably ignited and no unburned mixture is discharged from the combustion chamber.

DETAILED DESCRIPTION OF THE PREFERRED EMBODIMENTS (First Embodiment)

A description will be given below of a first embodiment in which the present invention is adapted to a four-cylinder in-line vehicular gasoline engine with reference to FIGS. 1 to 6.

Figure 1:
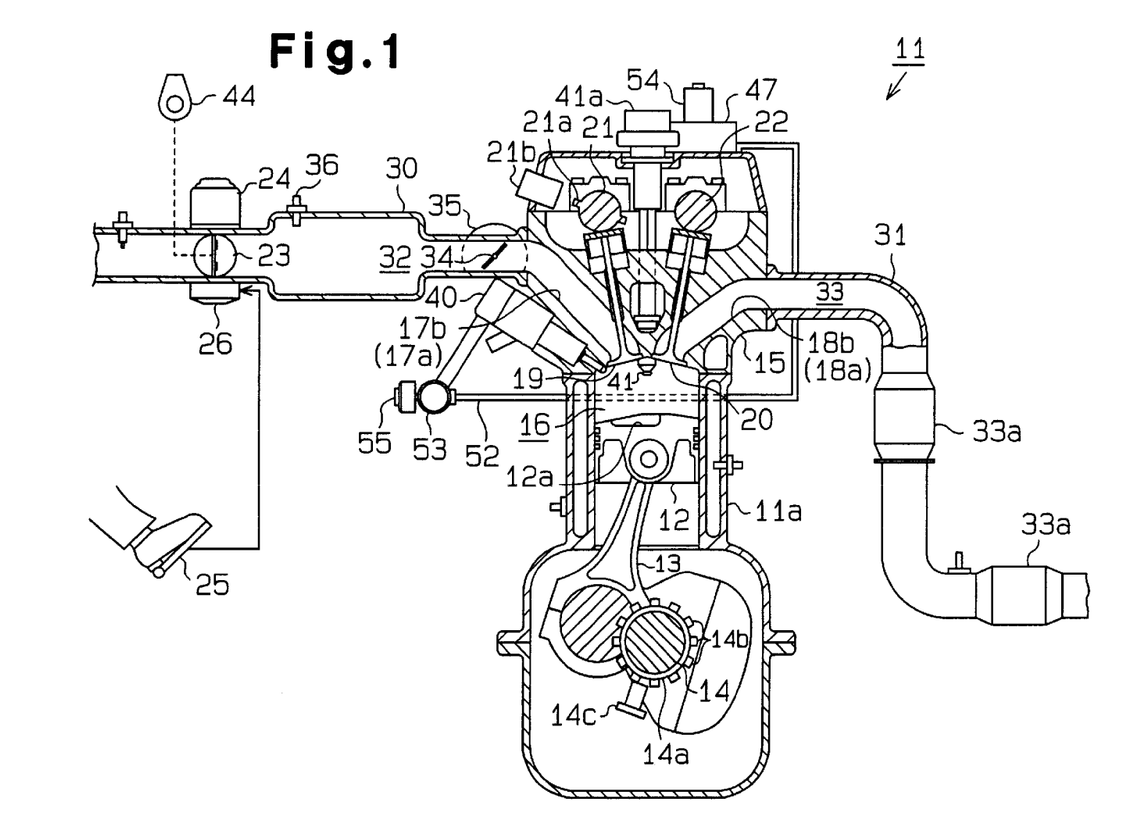
FIG. 1 is a cross-sectional view illustrating an engine according to a first embodiment of the present invention.

As shown in FIG. 1, an engine 11 has a cylinder block 11a having four cylinders (only one shown). Pistons 12, which are provided in association with the respective cylinders, reciprocate in the cylinder block 11a. Each piston 12 is coupled to a crankshaft or an output shaft 14 via a connecting rod 13. The reciprocal motion of the piston 12 is converted to rotary motion of the crankshaft 14 by the connecting rod 13. Formed in the top surface of the piston 12 is a dent 12a, which is needed to carry out stratified charge combustion.

A signal rotor 14a is attached to one end of the crankshaft 14. A plurality of projections 14b are provided on the outer surface of the signal rotor 14a at equal angular positions around the axis of the crankshaft 14. A crank position sensor 14c is provided to face the outer surface of the signal rotor 14a. As the crankshaft 14 rotates, the individual projections 14b on the signal rotor 14a pass, one by one, by the crank position sensor 14c. The crank position sensor 14c outputs a pulse-like detection signal in accordance with the passage of the projections 14b.

Figure 3:
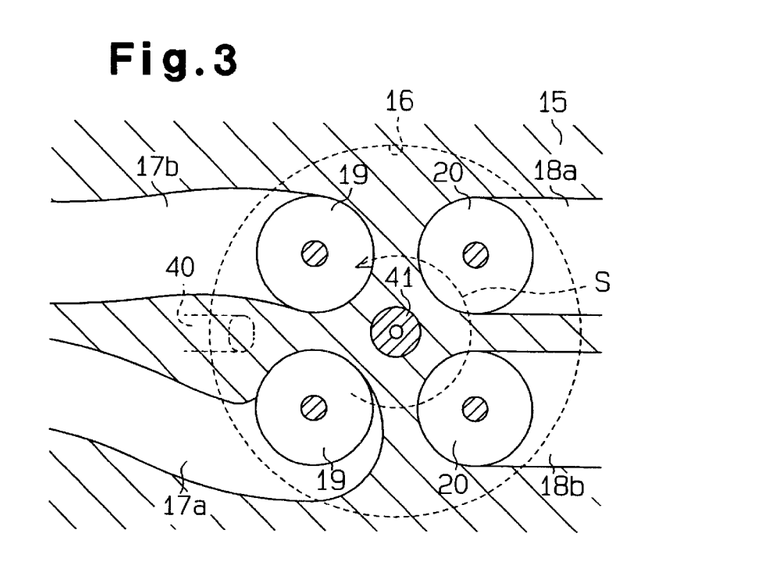
FIG. 3 is a cross-sectional view showing, in enlargement, a cylinder which the engine in FIG. 1 has.

A cylinder head 15 is attached to the top of the cylinder block 11a. A combustion chamber 16 is formed between the cylinder head 15 and each piston 12. As shown in FIGS. 1 and 3, a pair of intake ports 17a and 17b and a pair of exhaust ports 18a and 18b, which are provided in the cylinder head 15, are connected to each combustion chamber 16. As shown in FIG. 3, the intake port 17a is a curved helical port and the intake port 17b is a straight port, which is nearly straight. As air is taken into a combustion chamber 16 from the helical intake port 17a, a swirl, which turns in the direction indicated by an arrow S, is generated in that combustion chamber 16. A pair of intake valves 19 are provided in association with the pair of intake ports 17a and 17b. Likewise, a pair of exhaust valves 20 are provided in association with the pair of exhaust ports 18a and 18b.

As shown in FIG. 1, an intake cam shaft 21 for driving the intake valves 19 is rotatably supported on the cylinder head 15. Also, an exhaust cam shaft 22 for driving the exhaust valves 20 is rotatably supported on the cylinder head 15. The intake and exhaust cam shafts 21 and 22 are coupled to the crankshaft 14 via a drive and transmission mechanism, which includes a timing belt and gears (neither shown). As the intake cam shaft 21 is turned by the crankshaft 14, the intake valves 19 are driven to selectively connect and disconnect the intake ports 17a and 17b to and from the combustion chamber 16. As the exhaust cam shaft 22 is turned by the crankshaft 14, the exhaust valves 20 are driven to selectively connect and disconnect the exhaust ports 18a and 18b to and from the combustion chamber 16.

A cam position sensor 21b is provided on the cylinder head 15 to face the outer surface of one end of the intake cam shaft 21. One projection or a plurality of (two in FIG. 1) projections 21a are provided on the outer surface of one end of the intake cam shaft 21. As the intake cam shaft 21 rotates, the projections 21a pass the position that faces the cam position sensor 21b. The cam position sensor 21b outputs a pulse-like detection signal in accordance with the passage of the projections 21a.

An intake manifold 30 is connected to the intake ports 17a and 17b. An exhaust manifold 31 is connected to the exhaust ports 18a and 18b. The intake manifold 30 and the intake ports 17a and 17b constitute an intake passage 32, and the exhaust manifold 31 and the exhaust ports 18a and 18b constitute an exhaust passage 33. Two catalysts 33a for purifying the exhaust gas are provided in the exhaust passage 33. A throttle valve 23 is located in the intake passage 32. The throttle valve 23 is driven by a throttle motor 24 to regulate the amount of opening of the intake passage 32. The degree of opening of the throttle valve 23 is detected by a throttle position sensor 44.

The throttle motor 24 is controlled based on the depression amount of an acceleration pedal 25 provided in the compartment of a car. As the driver of the car steps on the acceleration pedal 25, the depression amount of the acceleration pedal 25 is detected by an acceleration position sensor 26 and the throttle motor 24 is controlled based on the result of that detection. The throttle motor 24 adjusts the degree of opening of the throttle valve 23. In accordance with the degree of opening of the throttle valve 23, the amount of air that is supplied into the combustion chamber 16 from the intake passage 32 is regulated.

Provided downstream of the throttle valve 23 is a vacuum sensor 36, which detects the internal pressure of the intake passage 32. The vacuum sensor 36 outputs a detection signal corresponding to the internal pressure of the intake passage 32. Provided downstream of the vacuum sensor 36 are swirl control valves (SCVs) 34 in association with the respective straight intake ports 17b. Each SCV 34 is driven by a swirl motor 35 to adjust the amount of opening of the associated straight intake port 17b. As the degree of opening of the SCV 34 becomes smaller, i.e., as the amount of air passing through the straight intake port 17b is reduced, the amount of air passing through the helical intake port 17a shown in FIG. 3 increases, and the swirl produced in the combustion chamber 16 becomes stronger.

As shown in FIG. 1, fuel injection valves 40, which directly inject fuel in the combustion chambers 16, are provided in the cylinder head 15 in association with the respective combustion chambers 16. Ignition plugs 41, which ignite the mixture of fuel and air in the combustion chambers 16, are provided in association with the respective combustion chambers 16. The timing at which the ignition plug 41 performs ignition is adjusted by an igniter 41a, which is provided above the ignition plug 41. The fuel that is injected into the combustion chamber 16 from the fuel injection valve 40 is mixed with the air that enters into the combustion chamber 16 from the intake passage 32, thus yielding the mixture of air and fuel in the combustion chamber 16. The mixture in the combustion chamber 16 is ignited by the ignition plug 41 and burned, and the exhaust gas that is produced by the combustion is sent to the exhaust passage 33.

In the engine 11, the pressure of the fuel that is supplied to the fuel injection valve 40 should be set relatively high to directly inject fuel into the combustion chamber 16, which is under high pressure. For that purpose, a fuel supply device for supplying high-pressure fuel to the fuel injection valve 40 is connected to the engine 11. The details of the fuel supply device will be discussed referring to FIG. 2.

Figure 2:
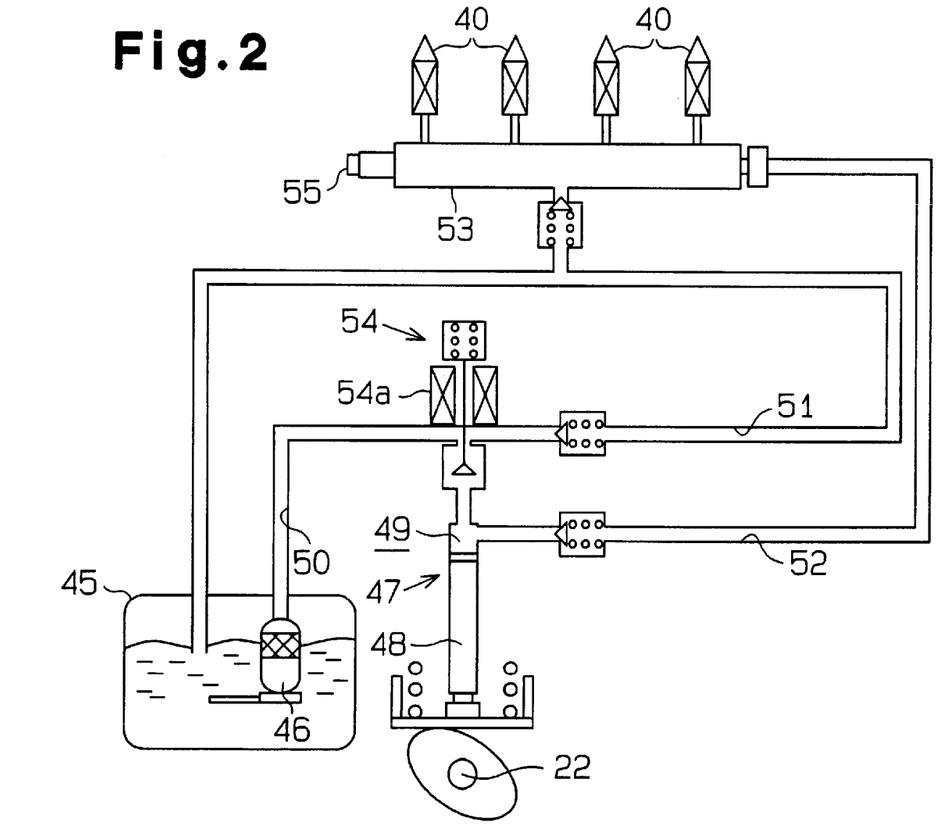
FIG. 2 is a schematic structural diagram showing a fuel supply device with which the engine in FIG. 1 is equipped.

As shown in FIG. 2, the fuel supply device has a feed pump 46, which is a primary feeding unit, and a booster pump 47, which is as a secondary feeding unit. The feed pump 46 pumps fuel from a fuel tank 45 at a predetermined pressure. The booster pump 47 further pressurizes the fuel pumped from the feed pump 46 and feeds that fuel to the fuel injection valves 40. The pressure of the fuel pumped from the feed pump 46 is, for example, 0.3 MPa.

The booster pump 47 has a plunger 48, which is moved back and forth by the exhaust cam shaft 22, and a pressure chamber 49 the volume of which changes by the reciprocation of the plunger 48. The pressure chamber 49 is connected to the feed pump 46 via a low-pressure fuel passage 50. The pressure chamber 49 is also connected to the fuel tank 45 via a return passage 51. The pressure chamber 49 is further connected to a delivery pipe 53 via a high-pressure fuel passage 52. The fuel injection valves 40 are connected to the delivery pipe 53. The delivery pipe 53 is provided with a fuel pressure sensor 55, which detects the pressure of the fuel that is supplied to the fuel injection valves 40.

The booster pump 47 has a solenoid valve 54, which selectively connects and disconnects the low-pressure fuel passage 50 and the return passage 51 to and from the pressure chamber 49. The solenoid valve 54 has an electromagnetic solenoid 54a. As the voltage applied to the electromagnetic solenoid 54a is controlled, the solenoid valve 54 is opened or closed. When the plunger 48 moves to increase the volume of the pressure chamber 49, energization of the electromagnetic solenoid 54a is stopped to open the solenoid valve 54. When the plunger 48 moves to decrease the volume of the pressure chamber 49, the electromagnetic solenoid 54a is energized to close the solenoid valve 54.

As the solenoid valve 54 is selectively opened and closed in this manner, the booster pump 47 pressurizes the fuel fed from the feed pump 46 to, for example, 12 MPa. The booster pump 47 feeds the pressurized fuel to the fuel injection valves 40 via the high-pressure fuel passage 52 and the delivery pipe 53. When the timing of closing the solenoid valve 54 is changed, the amount of fuel that is fed, under pressure, to the high-pressure fuel passage 52 from the booster pump 47 changes. The fuel pressure in the high-pressure fuel passage 52 and the delivery pipe 53, i.e., the pressure of the fuel that is supplied to the fuel injection valves 40, changes accordingly.

Specifically, when the plunger 48 moves to decrease the volume of the pressure chamber 49, the amount of fuel that is fed, under pressure, to the high-pressure fuel passage 52 from the booster pump 47 decreases as the timing of closing the solenoid valve 54 is delayed, thus lowering the pressure of the fuel supplied to the fuel injection valves 40. This is because the more the timing of closing the solenoid valve 54 is delayed, the greater the amount of the fuel that is returned to the fuel tank 45 from the booster pump 47 via the return passage 51 becomes.

Figure 4:
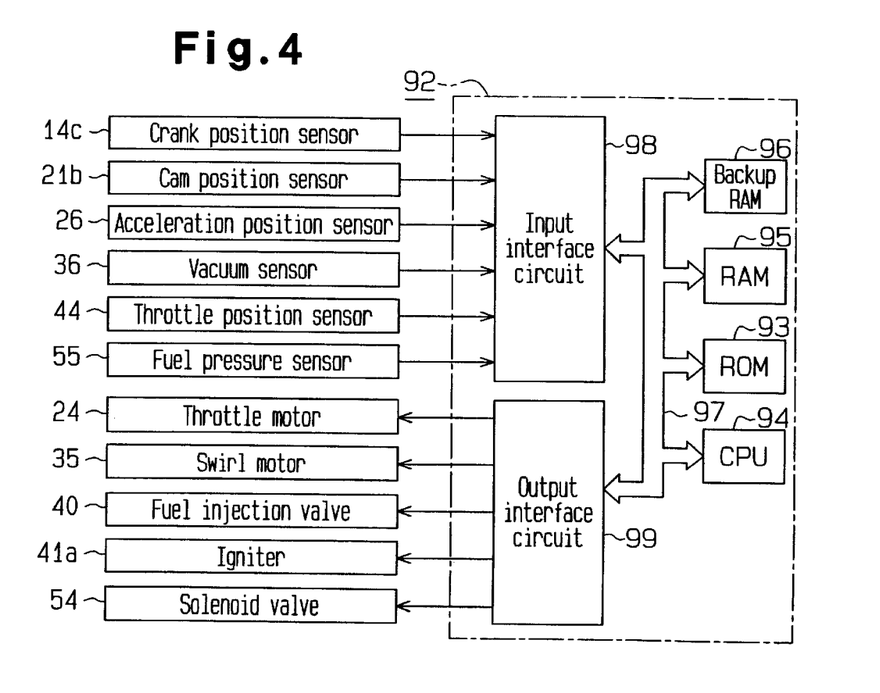
FIG. 4 is a block diagram showing the electric structure of a control device with which the engine in FIG. 1 is equipped.

The electric structure of the control device for the engine 11 will now be described referring to FIG. 4. As shown in FIG. 4, the control device has an electronic control unit (hereinafter called "ECU") 92 which controls the running state of the engine 11, which includes control procedures such as fuel injection amount control, fuel injection timing control, degree-of-throttle-opening control and fuel pressure control. The ECU 92 is constructed as an arithmetic logic circuit which includes a ROM 93, CPU 94, RAM 95 and backup RAM 96.

The ROM 93 is a memory that holds various control programs and maps or the like, which are referred to at the time of running the various control programs. The CPU 94 performs arithmetic operations based on the various control programs and maps stored in the ROM 93. The RAM 95 is a memory that temporarily stores the results of operations in the CPU 94 and data input from individual sensors. The backup RAM 96 is a non-volatile memory that stores data to be saved when the engine 11 is stopped. The ROM 93, CPU 94, RAM 95 and backup RAM 96 are connected to one another and are connected to an input interface circuit 98 and an output interface circuit 99, by a bus 97.

Connected to the input interface circuit 98 are the crank position sensor 14c, the cam position sensor 21b, the acceleration position sensor 26, the vacuum sensor 36, the throttle position sensor 44 and the fuel pressure sensor 55. Connected to the output interface circuit 99 are the throttle motor 24, the swirl motor 35, the fuel injection valves 40, the igniters 41a and the solenoid valve 54.

The ECU 92 acquires the internal pressure of the intake passage 32 (intake pressure PM) based on the detection signal from the vacuum sensor 36. The ECU 92 acquires an acceleration depression amount ACCP based on the detection signal from the acceleration position sensor 26. Further, the ECU 92 obtains the engine speed NE based on the detection signal from the crank position sensor 14c. The ECU 92 computes a fuel injection amount Q referring to a known map based on the intake pressure PM and the engine speed NE or the acceleration depression amount ACCP and the engine speed NE. The computed fuel injection amount Q increases as the engine speed NE increases and increases as the intake pressure PM or the acceleration depression amount ACCP increases. The fuel injection amount Q reflects the load applied to the engine 11.

The ECU 92 sets the combustion mode of the engine 11 to homogeneous charge combustion when the engine 11 is in the high speed and high load state. When the engine 11 is in the low speed and low load state, the ECU 92 sets the combustion mode of the engine 11 to stratified charge combustion. In the high engine speed and high load state, in which high power is required of the engine 11, homogeneous charge combustion is performed. This reduces the air-fuel ratio of the mixture, thus increasing the engine power. In the low engine speed and low load state, where high power is not required from the engine 11, stratified charge combustion is executed. This increases the air-fuel ratio of the mixture, thus improving the fuel efficiency.

When homogeneous charge combustion is to be carried out, the ECU 92 computes the fuel injection amount Q based on the intake pressure PM and the engine speed NE. The ECU 92 injects an amount of fuel corresponding to the computed fuel injection amount Q from the fuel injection valve 40 during the suction stroke of the engine 11. At this time, the air-fuel ratio of the mixture in the combustion chamber 16 is the stoichiometric air-fuel ratio or less. The ECU 92 controls the throttle motor 24, the igniter 41a and the swirl motor 35 such that the degree of throttle opening, the ignition timing and the degree of opening of the SCV 34 are suitable for homogeneous charge combustion.

When stratified charge combustion is to be performed, the ECU 92 computes the fuel injection amount Q based on the acceleration depression amount ACCP and the engine speed NE. The ECU 92 injects an amount of fuel corresponding to the computed fuel injection amount Q from the fuel injection valve 40 during the compression stroke of the engine 11. At this time, the air-fuel ratio of the mixture in the combustion chamber 16 becomes greater than the air-fuel ratio of the homogeneous charge combustion mode. The ECU 92 controls the throttle motor 24, the igniter 41a and the swirl motor 35 such that the degree of throttle opening, the ignition timing and the degree of opening of the SCV 34 are suitable for stratified charge combustion.

When stratified charge combustion is performed, the fuel injected from the fuel injection valve 40 enters the dent 12a (see FIG. 1) provided in the top of the piston 12. A swirl is produced in the combustion chamber 16 based on the adjustment of the degree of opening of the SCV 34, and the swirl and the movement of the piston 12 cause the injected fuel to gather around the ignition plug 41. Thus, even if the average air-fuel ratio of the mixture in the combustion chamber 16 is greater than that of the homogeneous charge combustion mode, the air-fuel ratio of the mixture around the ignition plug 41 suitable for ignition. As a result, the mixture is ignited well.

A description will follow of a fuel pressure control procedure which is executed by the ECU 92 and a fuel-cut control procedure that is executed when an abnormality occurs in the secondary feeding unit. An abnormality in the secondary feeding unit includes not only an abnormality in the booster pump 47 itself, but also an abnormality in the peripheral devices that are associated with the control of the booster pump 47, such as the control unit for the booster pump 47.

The ECU 92 obtains the actual pressure of fuel (fuel pressure) to be supplied to the fuel injection valve 40 based on the detection signal from the fuel pressure sensor 55, and controls the solenoid valve 54 so that the actual fuel pressure seeks a predetermined target value (e.g., 12 MPa). However, an electrical abnormality, such as disconnection or short circuiting in the electromagnetic solenoid 54a or fuel pressure sensor 55, or a mechanical abnormality, such as contamination of the booster pump 47 by foreign matter, may occur in the secondary feeding unit. When those abnormalities occur, even the aforementioned control on the solenoid valve 54 cannot set the actual fuel pressure to the target value, thus deteriorating the running state of the engine 11.

When an abnormality occurs in the secondary feeding unit, therefore, the ECU 92 sets the duty ratio of the voltage applied to the electromagnetic solenoid 54a of the solenoid valve 54 to 0%, thus keeping the solenoid valve 54 open. In this state, fuel pressurization by the booster pump 47 does not take place, and fuel injection from the fuel injection valves 40 is performed at the pressure (0.3 Mpa) provided by the feed pump 46. At this time, the ECU 92 sets the combustion mode of the engine 11 to homogeneous charge combustion. In stratified charge combustion, fuel is injected during the compression stroke of the engine 11 when the pressure in the combustion chambers 16 becomes highest. It is however difficult to execute fuel injection during the compression stroke since the fuel pressure, which is determined by the feed pump 46, is low. Therefore, homogeneous charge combustion is carried out by performing fuel injection during the suction stroke, when the pressure in the combustion chambers 16 is low.

When an abnormality occurs in the secondary feeding unit, homogeneous charge combustion is executed as mentioned above, causing the engine 11 to go to an operational state that is different from that in effect when the secondary feeding unit is normal, i.e., the engine 11 enters a retreat operational state. During the retreat operational state of the engine 11, the fuel pressure is fixed to a value of 0.3 Mpa, which is lower than normal. To obtain the required fuel injection amount Q, therefore, the fuel injection time, τ, must be greater than that used when the secondary feeding unit is normal. The following equation (1) shows the relationship between the fuel injection amount Q and the fuel injection time τ:

$$\tau = Q \times KPR \times A \tag{1}$$

τ: fuel injection time
Q: fuel injection amount
KPR: fuel-pressure correcting coefficient
A: constant determined by the fuel injection valve The fuel-pressure correcting coefficient KPR is a value that changes in accordance with the fuel pressure and increases as the fuel pressure decreases. When the fuel pressure is low, as in the retreat operational state of the engine 11, the fuel injection time τ increases. The greater the fuel injection amount Q becomes, the longer the fuel injection time τ becomes.

When the engine 11 changes to the retreat operational state, as the fuel injection time τ becomes excessively long according to an increase in the required fuel injection amount Q, fuel injection cannot be completed within an injectable period. The injectable period is, for example, the period during which the piston 12 moves from the top dead center of the suction stroke to the middle of the compression stroke, i.e., the period in which the crankshaft 14 rotates 270° from the state where the piston 12 is at the top dead center of the suction stroke. That is, the injectable period is equivalent to a crank angle range of, for example, 270° CA. The following describes the maximum fuel injection time, τ max, at the time fuel injection is carried out at the fuel pressure produced by the feed pump 46, with reference to the following equation (2). The maximum fuel injection time τ max is equivalent to the injectable period and the maximum value allowable for the fuel injection time τ.

$$\tau\ max = (60000/NE) \times (\theta/360°) \tag{2}$$

τ max: maximum fuel injection time [msec]
NE: engine speed [rpm]
θ: crank angle equivalent to the injectable period (e.g., 270° CA)

In the equation (2), 60000/NE represents the time (msec) that is needed for the crankshaft 14 to make one turn. θ is a fixed value. Therefore, the equation (2) shows that the maximum fuel injection time τ max is determined by the engine speed NE. Substituting the maximum fuel injection time τ max in the equation (2) for the fuel injection time c in the equation (1) yields the following equation (3). In the equation (3), the fuel injection amount Q in the equation (1) is expressed as an allowable maximum fuel injection amount $Q_{max}$ 14 corresponding to the maximum fuel injection time τ max. That is, the allowable maximum fuel injection amount $Q_{max}$ is the maximum fuel injection amount Q that can be injected under the fuel feeding pressure produced by the feed pump 46 in the maximum fuel injection time τ max.

$$Q_{max}=(60000/NE)\times(\theta/360°)/(KPR\times A)=C/NE \quad (3)$$

In the retreat operational state of the engine 11, the fuel pressure is fixed approximately at 0.3 MPa, so that the fuel-pressure correcting coefficient KPR, which changes according to the fuel pressure, can be considered constant. Both A and θ are fixed values. Therefore, all values other than the engine speed NE on the right-hand side of the equation (3) can be replaced with C, which is a fixed value. That is, the equation (3) shows that the allowable maximum fuel injection amount $Q_{max}$ is determined by the engine speed NE.

Figure 6:
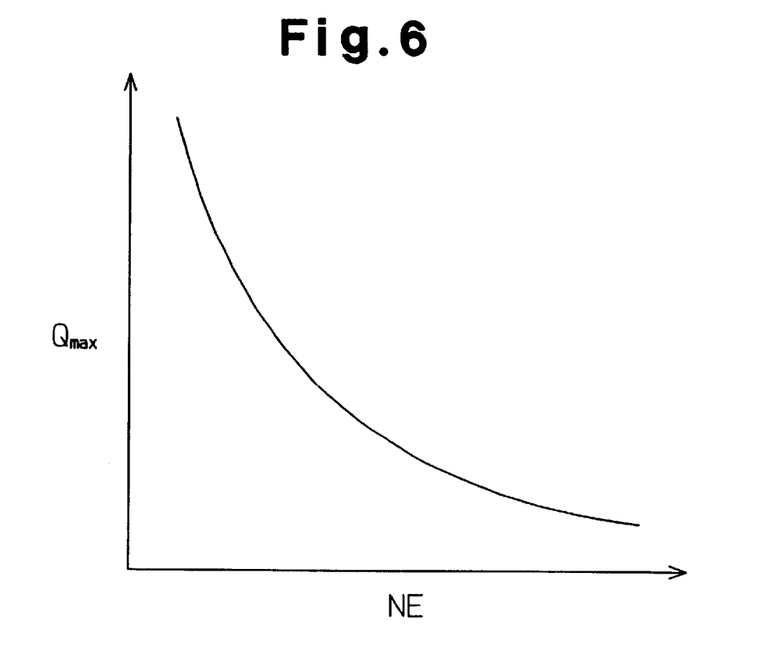
FIG. 6 is a graph showing a change in a maximum allowable injection amount with respect to a change in engine speed.

The graph in FIG. 6 shows variation of in the maximum allowable injection amount $Q_{max}$ with respect to changes in engine speed NE. As apparent from FIG. 6, the higher the engine speed NE is, the smaller the allowable maximum fuel injection amount $Q_{max}$ becomes. This is because the maximum fuel injection time τ max becomes smaller as the engine speed NE increases.

When the fuel injection amount Q, which is computed based on the intake pressure PM and the engine speed NE, is smaller than the allowable maximum fuel injection amount $Q_{max}$, which is indicated by the solid line in FIG. 6, in the retreat operational state of the engine 11, the air-fuel ratio of the mixture in the combustion chambers 16 can be set to the stoichiometric air-fuel ratio.

When the fuel injection amount Q, which is computed based on the intake pressure PM and the engine speed NE, is larger than the allowable maximum fuel injection amount $Q_{max}$, which is indicated by the solid line in FIG. 6, in the retreat operational state of the engine 1, on the other hand, the fuel injection time τ exceeds the maximum fuel injection time τ max, and fuel injection cannot be completed within the range of the crank angle e that is equivalent to the injectable period. In this case, the amount of fuel supplied to the combustion chambers 16 does not reach the required value, and the air-fuel ratio of the mixture in the combustion chambers 16 becomes larger than the proper value. Therefore, it is not certain that the mixture will ignite, and a misfire may occur. When a misfire occurs, unburned mixture enters the exhaust passage 33 from the combustion chamber 16. If the unburned mixture is combusted by the heat of the exhaust passage 33, the catalysts 33a, which are provided in the exhaust passage, are overheated and damaged.

In the present embodiment, therefore, when the fuel injection amount Q is larger than the allowable maximum fuel injection amount $Q_{max}$ in the retreat operational state of the engine 11, fuel injection from the fuel injection valves 40 is inhibited, or fuel cutting is executed. Therefore, the occurrence of misfire is prevented, which prevents unburned mixture from entering the exhaust passage 33 from the combustion chamber 16 and overheating of the catalysts 33a originating from combustion of that mixture.

Figure 5:
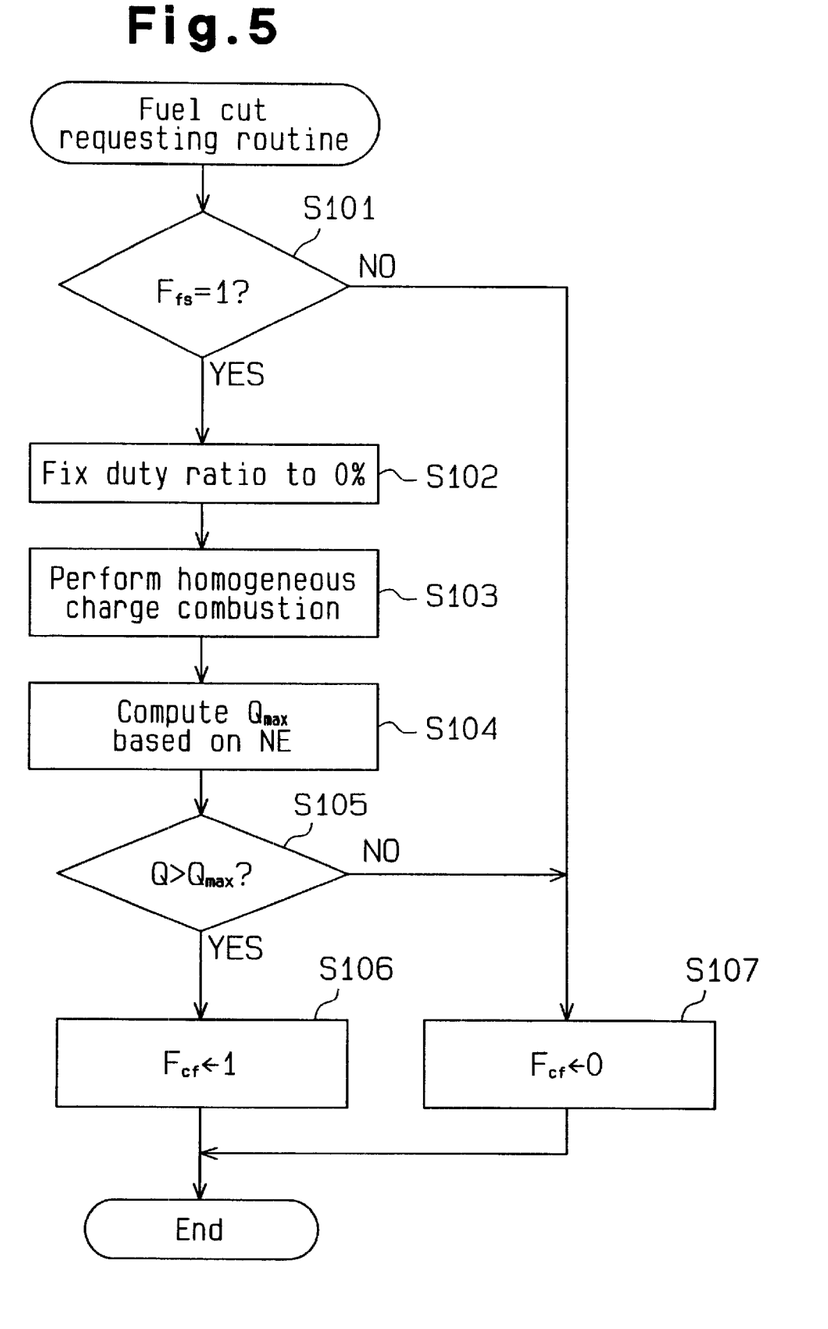
FIG. 5 is a flowchart illustrating a fuel cut requesting routine, which is executed by an ECU.

FIG. 5 is a flowchart illustrating a fuel cut requesting routine, which is executed by the ECU 92. This routine is executed as an interruption of, for example, at predetermined intervals.

First, in step S101, the ECU 92 determines whether or not a failsafe execution flag $F_{fs}$ set in the RAM 95 is "1". The failsafe execution flag $F_{fs}$ is for determining an abnormality in the secondary feeding unit, specifically, an abnormality in the booster pump 47 or an abnormality in the peripheral devices that are associated with the control of the booster pump 47.

The ECU 92 detects an electrical abnormality, such as disconnection or shortcircuiting, in an unillustrated separate routine, based on the input/output current value and voltage value with respect to the electromagnetic solenoid 54a and the fuel pressure sensor 55. The ECU 92 detects or a mechanical abnormality, such as contamination of the booster If pump 47 by foreign matter, from the fuel pressure obtained based on the detection signal from the fuel pressure sensor 55 under the condition that the fuel pressure sensor 55, is normal, and the duty ratio of the voltage applied to the electromagnetic solenoid 54a.

When detecting the occurrence of an abnormality such as the one mentioned above, the ECU 92 sets the failsafe execution flag $F_{fs}$ to "1". When the ECU 92 does not detect the occurrence of an abnormality such as the one mentioned above, the ECU 92 sets the failsafe execution flag $F_{fs}$ to "0".

When $F_{fs}=0$ in step S101, the ECU 92 determines that there is no abnormality in the secondary feeding unit, and proceeds to step S107. In step S107, the ECU 92 sets a fuel-cut request flag $F_{fc}$ set in the RAM 95 to "0" and temporarily terminates the routine. The fuel-cut request flag $F_{fc}$ is for determining whether or not to execute fuel cutting. When the fuel-cut request flag $F_{fc}$ is "0", the ECU 92 does not carry out fuel cutting. When the fuel-cut request flag $F_{fc}$ is "1", the ECU 92 executes fuel cutting by controlling the fuel injection valves 40 according to an unillustrated separate routine.

When $F_{fs}=1$ in step S101, on the other hand, the ECU 92 determines that there is an abnormality in the secondary feeding unit and proceeds to step S102. In step S102, the ECU 92 fixes the duty ratio of the voltage applied to the electromagnetic solenoid 54a of the solenoid valve 54 to 0%. Therefore, the solenoid valve 54 is kept open and fuel pressurization based on the driving of the booster pump 47 is stopped. In this state, fuel injection from the fuel injection valves 40 is performed at the fuel feeding pressure (0.3 MPa) of the feed pump 46.

In subsequent step S103, the ECU 92 sets the combustion mode of the engine 11 to homogeneous charge combustion and causes the engine 11 to perform the retreat operation. Next, in step S104, the ECU 92 calculates the allowable maximum fuel injection amount $Q_{max}$ according to the equation (3) based on the engine speed NE.

In step S105, the ECU 92 determines whether or not the fuel injection amount Q obtained in the unillustrated separate routine is larger than the allowable maximum fuel injection amount $Q_{max}$, i.e., whether or not fuel injection based on the computed fuel injection amount Q can be finished within the range of the crank angle θ that is equivalent to the injectable period during the retreat operation of the engine 11. When $Q>Q_{max}$ is not satisfied, the ECU 92 determines that fuel cutting is unnecessary and goes to step S107. When $Q>Q_{max}$ is satisfied, the ECU 92 determines that fuel cutting is needed and goes to step S106. In step S106, the ECU 92 sets the fuel-cut request flag $F_{fc}$ to "11" and temporarily terminates the routine.

When the fuel-cut request flag $F_{fc}$ is "1", the ECU 92 executes fuel cutting according to the unillustrated separate routine. When the acquired fuel injection amount Q is larger than the allowable maximum fuel injection amount $Q_{max}$ and fuel injection based on the computed fuel injection amount Q cannot be completed within the injectable period while the engine 11 is in the retreat operation, fuel injection is not performed. As mentioned earlier, this prevents misfire from occurring and prevents the discharge of unburned mixture and the resulting overheating of the catalysts 33a.

When the engine speed NE drops as a result of the execution of fuel cutting, the allowable maximum fuel injection amount $Q_{max}$, based on the reduced engine speed NE, increases. When the computed fuel injection amount Q becomes equal to or smaller than the allowable maximum fuel injection amount $Q_{max}$, the ECU 92 reaches a negative decision in step S105 and goes to step S107. Therefore, the fuel-cut request flag $F_{fc}$ is set to "0" and fuel cutting is stopped.

(Second Embodiment)

The second embodiment of the present invention will now be described referring to FIGS. 7 and 8, focusing on the differences from the embodiment in FIGS. 1 to 6. In this embodiment, instead of executing fuel cutting, the amount of air to be taken into the combustion chambers 16 (intake air amount) is restricted in the retreat operational mode of the engine 11 such that the computed fuel injection amount Q does not become greater than the allowable maximum fuel injection amount $Q_{max}$. The intake air amount is adjusted by controlling the degree of opening of the throttle valve 23 (degree of throttle opening).

An outline of the degree-of-throttle-opening control that is executed through the ECU 92 will be discussed first. The ECU 92 acquires a basic throttle opening degree TRTB based on the running state of the engine 11 including the acceleration depression amount ACCP and the engine speed NE and sets the basic throttle opening degree TRTB as a target throttle opening degree TRT. The ECU 92 acquires the actual degree of throttle opening based on the detection signal from the throttle position sensor 44 and controls the throttle motor 24 such that the actual degree of throttle opening coincides with the target throttle opening degree TRT. Under this degree-of-throttle-opening control, as the acceleration depression amount ACCP increases, the degree of throttle opening increases and the intake air amount increases.

When an abnormality occurs in the secondary feeding unit and the engine 11 goes into the retreat operation, the ECU 92 restricts the intake air amount such that the computed fuel injection amount Q does not exceed the allowable maximum fuel injection amount $Q_{max}$. Specifically, the ECU 92 sets an upper limit value G for the degree of throttle opening based on the engine speed NE by referring to the map shown in FIG. 7. As shown in FIG. 7, the upper limit value G decreases as the engine speed NE increases. The ECU 92 sets the target throttle opening degree TRT within a range that does not exceed the upper limit value G. This restricts the degree of throttle opening, thus restricting the intake air amount.

When the degree of throttle opening, or the intake air amount, is restricted, the intake pressure PM is reduced to a small value. Homogeneous charge combustion is executed when the engine 11 is in the retreat operation. When homogeneous charge combustion is executed, the fuel injection amount Q is computed based on the intake pressure PM and the engine speed NE. The computed fuel injection amount Q decreases as the intake pressure PM decreases. If the intake pressure PM is reduced to a small value by restricting the intake air amount, therefore, the computed fuel injection amount Q is prevented from exceeding the allowable maximum fuel injection amount $Q_{max}$.

Figure 7:
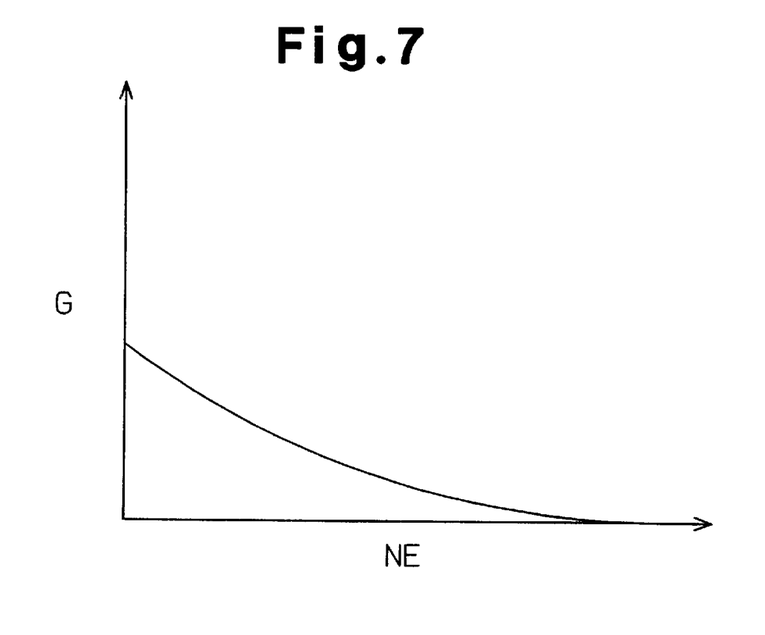
FIG. 7 is a map, which is referred to at the time of computing the upper limit value of the degree of throttle opening according to a second embodiment of the invention.

Because the upper limit value G for the degree of throttle opening decreases as the engine speed NE increases as shown in FIG. 7, the intake air amount, i.e., the intake pressure PM, is restricted further as the engine speed NE increases. Even if the engine speed NE increases, therefore, the computed fuel injection amount Q is limited as a consequence and does not exceed the allowable maximum fuel injection amount $Q_{max}$. Completion of fuel injection based on the computed fuel injection amount Q within the injectable period is thus certain. Accordingly, the air-fuel ratio does not exceed the proper value during the retreat operation of the engine 11 and the mixture in the combustion chambers 16 is certainly ignited.

Figure 8:
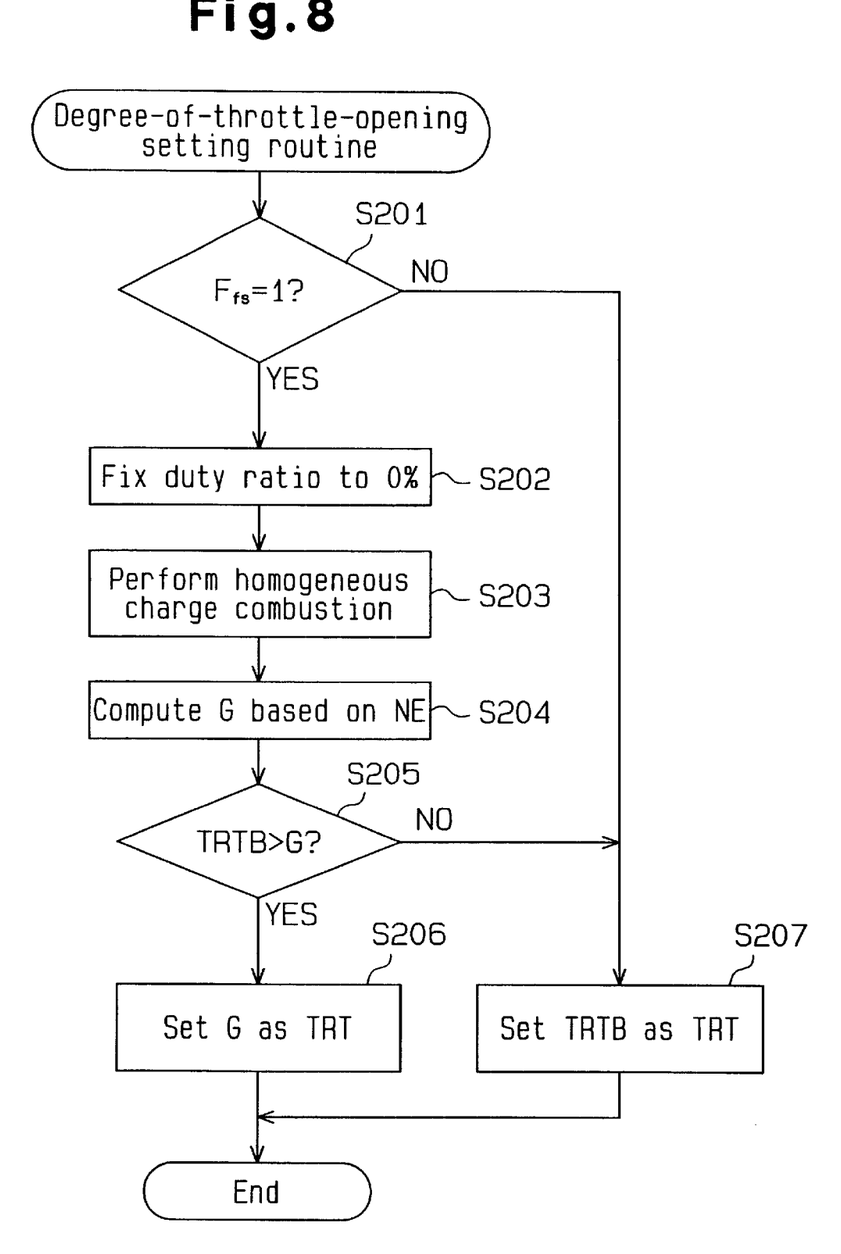
FIG. 8 is a flowchart illustrating a degree-of-throttle-opening setting routine, which is executed by the ECU.

FIG. 8 is a flowchart illustrating a degree-of-throttle-opening setting routine for setting the target throttle opening degree TRT. The ECU 92 executes this routine as an interruption as, for example, predetermined time intervals.

First, in step S201, the ECU 92 determines whether the failsafe execution flag $F_{fs}$ is "1" or not. When $F_{fs}$=0, the ECU 92 determines that there is no abnormality in the secondary feeding unit and proceeds to step S207. In step S207, the ECU 92 sets the basic throttle opening degree TRTB acquired in an unillustrated separate routine as the target throttle opening degree TRT and temporarily terminates the routine.

When $F_{fs}$=1 in step S201, on the other hand, the ECU 92 considers that there is an abnormality in the secondary feeding unit and proceeds to step S202. In step S202, the duty ratio of the voltage applied to the electromagnetic solenoid 54a is fixed to 0%. Therefore, fuel pressurization based on the driving of the booster pump 47 is stopped and fuel injection is performed at the low fuel feeding pressure of the feed pump 46.

In subsequent step S203, the ECU 92 sets the combustion mode of the engine 11 to homogeneous charge combustion and causes the engine 11 to perform the retreat operation. Next, in step S204, the ECU 92 acquires the upper limit value G for the degree of throttle opening based on the engine speed NE by referring to the map in FIG. 7.

In step S205, the ECU 92 determines whether or not the basic throttle opening degree TRTB obtained in the unillustrated separate routine is larger than the upper limit value G. When TRTB>G is not satisfied, the ECU 92 proceeds to step S207. When TRTB>G is satisfied, the ECU 92 goes to step S206. In step S206, the ECU 92 sets the upper limit value G as the target throttle opening degree TRT and temporarily terminates the routine.

When the engine 11 is in the retreat operation, the target throttle opening degree TRT set in step S206 or step S207 does not exceed the upper limit value G. Accordingly, the intake air amount is restricted such that the fuel injection amount Q does not exceed the allowable maximum fuel injection amount $Q_{max}$. This guarantees complete fuel injection based on the computed fuel injection amount Q within the injectable period. Accordingly, the air-fuel ratio does not exceed the proper value and the mixture in the combustion chambers 16 is certainly ignited, thus preventing misfire and misfire-originated overheating of the catalysts 33a.

The above-described embodiments may be modified as follows.

Figure 9:
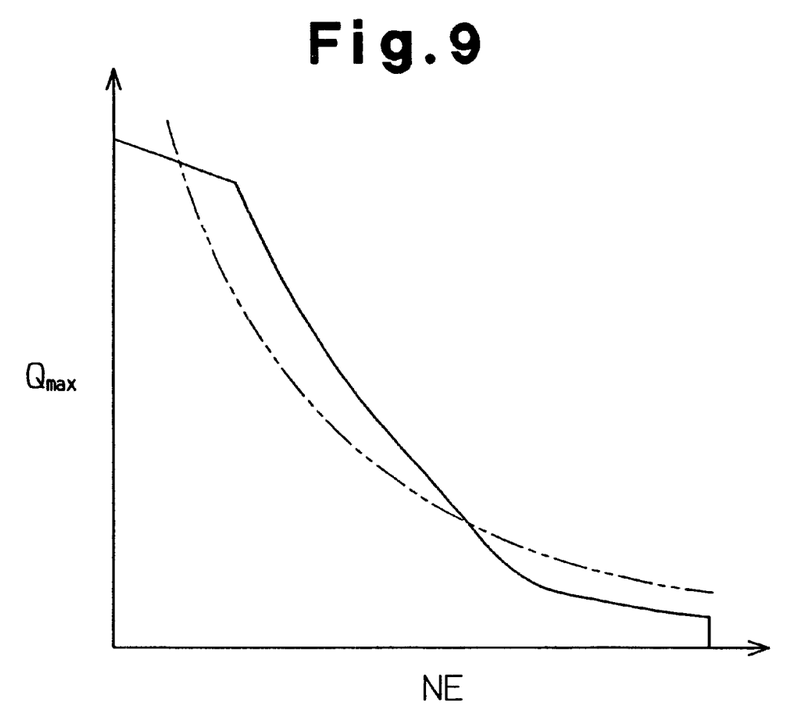
FIG. 9 is a map, which is referred to at the time of computing an allowable maximum injection amount according to a further embodiment of the present invention.

Although the allowable maximum fuel injection amount $Q_{max}$ is obtained according to the equation (3) in the embodiment in FIGS. 1 to 6, the allowable maximum fuel injection amount $Q_{max}$ may be obtained instead by referring to the values that are indicated by the solid line in the map shown in FIG. 9. This map is a plot of changes in the allowable maximum fuel injection amount $Q_{max}$ with respect to changes in engine speed NE. The allowable maximum fuel injection amount $Q_{max}$ acquired based on the equation 3 changes as indicated by the two-dot chain line on the map in FIG. 9. The allowable maximum fuel injection amount $Q_{max}$ indicated by the solid line falls below the allowable maximum fuel injection amount $Q_{max}$ indicated by the two-dot chain line when the engine speed is very high or very low and exceeds the allowable maximum fuel injection amount $Q_{max}$ indicated by the two-dot chain line at intermediate engine speeds.

Even when the air-fuel ratio of the mixture is larger than the stoichiometric air-fuel ratio, there is a range of the engine speed NE where misfire does not occur. In the low engine speed area and the high engine speed area of the engine 11, misfire is not likely to occur. Therefore, the allowable maximum fuel injection amount $Q_{max}$ is set as indicated by the solid line. Setting the allowable maximum fuel injection amount $Q_{max}$ according to the map in FIG. 9 reliably prevents unnecessary execution of fuel cutting under conditions where misfire will not occur and permits fuel cutting under conditions where misfire occurs. This ensures more appropriate execution of fuel cutting. This prevents the operational performance of the engine 11 from dropping unnecessarily.

The embodiment in FIGS. 1 to 6 may be combined with the embodiment in FIGS. 7 and 8 execute both fuel cutting and restriction of the intake air amount. In this case, the operational range of the engine 11 where fuel cutting is executed may be distinguished from the operational range of the engine 11 where the intake air amount is restricted.

What is claimed is:

1. A control apparatus for an engine, wherein the engine burns a mixture of air drawn into and fuel injected into a combustion chamber, the apparatus comprising:
    a fuel injection valve for injecting fuel directly into the combustion chamber;
    an air intake passage for delivering air to the combustion chamber;
    a primary fuel pump for pressurizing fuel destined for the fuel injection valve;
    a secondary fuel pump, which further pressurizes fuel that has been pressurized by the primary fuel pump and supplies the further pressurized fuel to the fuel injection valve;
    a computer for controlling the primary fuel pump, wherein the computer stops the secondary fuel pump such that the fuel injection valve performs fuel injection with fuel from the primary fuel pump, at a pressure produced by the primary fuel pump, when there is an abnormality concerning the secondary fuel pump, wherein the computer computes an amount of fuel to be injected from the fuel injection valve based on a running state of the engine, wherein, if the computed fuel injection amount is greater than a predetermined allowable value when the secondary fuel pump is not operating, the computer prevents fuel injection by the fuel injection valve to prevent a mixture that may cause a misfire from being formed in the combustion chamber.

2. The control apparatus according to claim 1, wherein, in a cycle of the engine, a period during which fuel can be injected into the combustion chamber, or an injectable period, is predetermined, and the predetermined allowable value represents the maximum amount of fuel that is allowed to be injected during the injectable period according to the fuel pressure produced by the primary fuel pump.

3. The control apparatus according to claim 1, wherein the predetermined allowable value is determined in accordance with the running state of the engine, which includes the engine speed.

4. The control apparatus according to claim 3, wherein the predetermined allowable value decreases as the engine speed increases.

5. The control apparatus according to claim 1, wherein the engine performs a combustion mode selected from a plurality of combustion modes, the combustion modes including stratified charge combustion, which is combustion of a mixture distributed unevenly in the combustion chamber, and homogeneous charge combustion, which is combustion of a mixture distributed homogeneously in the combustion chamber, and the homogeneous charge combustion is selected when the secondary fuel pump is stopped.

6. The control apparatus according to claim 5, wherein in the stratified charge combustion mode, the fuel injection valve injects fuel during a compression stroke of the engine, and in the homogeneous charge combustion mode, the fuel injection valve injects fuel during a suction stroke of the engine.

7. The control apparatus according to claim 5, wherein when the stratified charge combustion is performed, the computer computes the fuel injection amount based on the pressure of the air being drawn into the combustion chamber and the engine speed.

8. A control apparatus for an engine, wherein the engine burns a mixture of air drawn into and fuel injected into a combustion chamber, the apparatus comprising:
    a fuel injection valve for injecting fuel directly into the combustion chamber;
    an air intake passage for delivering air to the combustion chamber;
    a primary fuel pump for pressurizing fuel destined for the fuel injection valve;
    a secondary fuel pump, which further pressurizes fuel that has been pressurized by the primary fuel pump and supplies the further pressurized fuel to the fuel injection valve;
    a computer for controlling the primary fuel pump, wherein the computer stops the secondary fuel pump such that the fuel injection valve performs fuel injection with fuel from the primary fuel pump, at a pressure produced by the primary fuel pump, when there is an abnormality concerning the secondary fuel pump, wherein the computer computes an amount of fuel to be injected from the fuel injection valve based on a running state of the engine, the computer limits the amount of air drawn into the combustion chamber such that the computed fuel injection amount does not exceed a predetermined allowable value to prevent a mixture that may cause a misfire from being formed in the combustion chamber.

9. The control apparatus according to claim 8, wherein the intake passage is connected to the combustion chamber, and a throttle valve for regulating the opening degree of the intake passage is located in the intake passage, and the computer prevents the throttle valve from opening beyond a predetermined upper limit value to limit the amount of air drawn into the combustion chamber.

10. The control apparatus according to claim 9, wherein the predetermined upper limit value is based on the running state of the engine, which includes the engine speed.

11. The control apparatus according to claim 10, wherein the predetermined upper limit value decreases as the engine speed increases.

12. The control apparatus according to claim 8, wherein, in a cycle of the engine, a period during which fuel can be injected into the combustion chamber, or an injectable period, is predetermined, and the predetermined allowable value represents the maximum amount of fuel that is allowed to be injected during the injectable period according to the fuel pressure produced by the primary fuel pump.

13. The control apparatus according to claim 8, wherein the engine performs a combustion mode selected from a plurality of combustion modes, the combustion modes including stratified charge combustion, which is combustion of a mixture distributed unevenly in the combustion chamber, and homogeneous charge combustion, which is combustion of a mixture distributed homogeneously in the combustion chamber, and the homogeneous charge combustion is selected when the secondary fuel pump is stopped.

14. The control apparatus according to claim 13, wherein in the stratified charge combustion mode, the fuel injection valve injects fuel during a compression stroke of the engine, and in the homogeneous charge combustion mode, the fuel injection valve injects fuel during a suction stroke of the engine.

15. The control apparatus according to claim 13, wherein when the stratified charge combustion is performed, the computer computes the fuel injection amount based on the pressure of the air being drawn into the combustion chamber and the engine speed.

16. A control method for an engine that produces power by burning a mixture of air and fuel in a combustion chamber, the method comprising:

pressurizing and sending fuel to a fuel injection valve;

boosting the pressure of the fuel sent to the injection valve;

injecting the pressurized fuel into the combustion chamber from the fuel injection valve;

stopping the pressure boosting when an abnormally occurs in the pressure boosting;

computing an amount of fuel to be injected from the fuel injection valve based on a running state of the engine; and preventing fuel injection to prevent the mixture that causes a misfire from being formed in the combustion chamber when the computed fuel injection amount is greater than a predetermined allowable valve while the pressure boosting is stopped.

17. A control method for an engine that produces power by burning a mixture of air and fuel in a combustion chamber, the method comprising:

pressurizing and sending fuel to a fuel injection valve;

boosting the pressure of the fuel sent to the injection valve;

injecting the pressurized fuel into the combustion chamber from the fuel injection valve;

stopping the pressure boosting when an abnormally occurs in the pressure boosting;

computing an amount of fuel to be injected from the fuel injection valve based on the running state of the engine; and limiting the amount of air drawn into the combustion chamber such that the computed fuel injection amount does not exceed a predetermined allowable value to prevent the mixture that causes a misfire from being formed in the combustion chamber when the boosting is stopped.

18. A control method for an engine that produces power by burning a mixture of air and fuel in a combustion chamber, the method comprising:

pressurizing fuel and sending the pressurized fuel to a fuel injection valve;

boosting the pressure of the fuel sent to the injection valve to a boosted pressure;

injecting the fuel into the combustion chamber at the boosted pressure from the fuel injection valve;

determining whether there is an abnormality concerning the boosting;

stopping the boosting when an abnormality is detected in the determining step;

determining a maximum fuel injection amount based on engine speed and the fuel pressure produced by the pressurizing step when the pressure boosting is stopped;

computing an amount of fuel to be injected from the fuel injection valve based on a running state of the engine; and preventing fuel injection to prevent the mixture that causes a misfire from being formed in the combustion chamber when the computed fuel injection amount is greater than the determined maximum fuel injection amount while the pressure boosting is stopped.

19. The control method according to claim 18, further including controlling the engine to perform homogenous charge combustion when there is an abnormality concerning the boosting step.

20. A control method of an engine that produces power by burning a mixture of air and fuel in a combustion chamber, the method comprising:

pressurizing fuel and sending the pressurized fuel to a fuel injection valve;

boosting the pressure of the fuel sent to the injection valve to a boosted pressure;

injecting the fuel into the combustion chamber at the boosted pressure from the fuel injection valve;

determining whether there is an abnormality concerning the boosting;

stopping the boosting when an abnormality is detected in the determining step;

determining a maximum fuel injection amount based on engine speed and the fuel pressure produced by the pressurizing step when the pressure boosting is stopped;

computing an amount of fuel to be injected from the fuel injection valve based on a running state of the engine; and limiting the amount of air drawn into the combustion chamber such that the computed fuel injection amount does not exceed the determined maximum fuel injection amount to prevent the mixture that causes a misfire from being formed in the combustion chamber when the pressure boosting is stopped.

* * * * *